(12) United States Patent
Ricard et al.

(10) Patent No.: US 10,860,564 B2
(45) Date of Patent: Dec. 8, 2020

(54) AUTOMATIC GENERATION OF DATA FOUNDATION FRAGMENTS

(71) Applicant: SAP SE, Walldorf (DE)

(72) Inventors: Christophe Ricard, L'Hay-les-Roses (FR); Naeem Asghar, London (GB)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 16/172,707

(22) Filed: Oct. 26, 2018

(65) Prior Publication Data
US 2020/0133932 A1 Apr. 30, 2020

(51) Int. Cl.
G06F 16/00 (2019.01)
G06F 16/22 (2019.01)
G06F 16/2455 (2019.01)
G06F 16/25 (2019.01)

(52) U.S. Cl.
CPC ...... *G06F 16/2282* (2019.01); *G06F 16/2456* (2019.01); *G06F 16/252* (2019.01)

(58) Field of Classification Search
CPC .................................................. G06F 16/2282

USPC .................................................. 707/803, 754
See application file for complete search history.

(56) References Cited

U.S. PATENT DOCUMENTS

| | | | |
|---|---|---|---|
| 2014/0095518 A1* | 4/2014 | Schneider | G06F 7/24 707/754 |
| 2014/0181154 A1* | 6/2014 | Amulu | G06F 16/28 707/803 |
| 2015/0154240 A1* | 6/2015 | Vezzosi | G06Q 10/06 707/803 |

* cited by examiner

*Primary Examiner* — Chelcie L Daye
(74) *Attorney, Agent, or Firm* — Buckley, Maschoff & Talwalkar LLC

(57) ABSTRACT

A system, method, and computer-readable medium, including creating at least one data foundation table, each of the at least one data foundation tables being created for each of one or more set tables in a database based on information stored in a first set container relying on the one or more set tables; linking at least one of the created data foundation tables to a customer table in the database, the created data foundation table being linked to the customer table based on a primary key for the customer table; and storing all of the created data foundation tables in the a dedicated data structure hosted by the first set container.

20 Claims, 19 Drawing Sheets

600

PUBLISH UNIVERSE TO EXPOSE ITS BUSINESS OBJECTS (BOs)
605

CREATE SET CONTAINERS
610

LINK THE UNIVERSE AND ONE OR MORE OF THE SET CONTAINERS TO EACH OTHER
615

CREATE SETS ON TOP OF THE UNIVERSE'S BO's
620

DETERMINE THE SET CONTAINERS LINKED TO THE UNIVERSE TO BE QUERIED BASED ON THE REPOSITORY RELATIONSHIPS OF THE UNIVERSE
805

RETAIN, IN ACCORDANCE WITH A SECURITY POLICY, THE ALLOWED SET CONTAINERS
810

RETAIN, IN ACCORDANCE WITH THE SECURITY POLICY, THE ALLOWED BOs
815

RETAIN, IN ACCORDANCE WITH THE SECURITY POLICY, THE ALLOWED SET(S)
820

PRESENT A CONSOLIDATED VIEW OF THE RELEVANT BOs AND ALLOWED SET(S) TO AN END USED VIA A UI
825

*FIG. 8*

```
public class TableDesc {
    String name;
    List<Column> columns;
    PrimaryKey primaryKey;
    PrimaryKey virtualPKey;
    ...
}
```

```
1300 private static Table insertSetTable (BusinessSegmentation segmentation,
                                     Universe universe,
                                     TableDesc tabledesc,
                                     Table originalTable,
                                     String subjectName,
                                     IConnectionSolver solver) {

DataFoundation dataFoundation = ((SQLBindingSet)universe.getBindingSets().get(0)).getDa if (originalTable ==null) {
        SQLTable sqlTable = DataFoundationFactory.eINSTANCE.createSQLTABLE();

sqlTable.setBusinessName(tableDesc.getName());
        sqlTable.setType(SETS_AUTOGENERATED_TABLE_TYPE);
        sqlTable.setQualifier(segmentation.getM13nOwneer()==null ? "" :segmentation.getM13nOwne
        sqlTabel.setDataSource(dataFoundation.getDataSource());

createColumns(sqlTable, tableDesc);
        dataFoundation.getTables().add(sqlTable);

1305 ──▶ DelimitationHelper.delimitTable(sqlTable, dataFoundation, solver);

return sqlTable;

private static void createColumns(SQLTable table, TableDesc tableDesc) {
    List<Column> pKeyColumns = new ArrayList<Column>();

for (com.businessobjects.sets.services.table.Column setCol : tableDesc.getColumns()){
        Column column = DataFoundationFactory.eINSTANCE.createColumn();
        Column.setBusinessName(setCol.getName());
        column.setDataType (MTSQLHelper.convertDataTypeToSQLDataType(setCol.getType()));
        column = DataFoundationFactory.eINSTANCE.createColumn();
        column.setDecimalDigits(10);
        column.setDisplaySize(10);
        column.setNullable(setCol.isNull());
        //column.setUnsigned(fieIinfo.Unsigned());
        table.getColumns().add(column);

PrimaryKey key = null;
        if (tableDesc.getPrimaryKey() !=null){
           key = tableDesc.getPrimaryKey();
        }else if (tableDesc.getVirtualPkey() !=null) {
           key = tableDesc.getVirtualPkey();
        }
```

FIG. 13

```
TableView tvMaster = ViewFactory.eINSTANCE.createTableView();
tvMaster.setTable(table);
tagTableView(tvMaster, DataFoundationHelper.MASTERVIEW_TAG);
if (table.getDataFoundation() == null)
    dfxView.getDataFoundation().getDataFoundationViews().get(0).getTableViews().add(tvMaster);
```

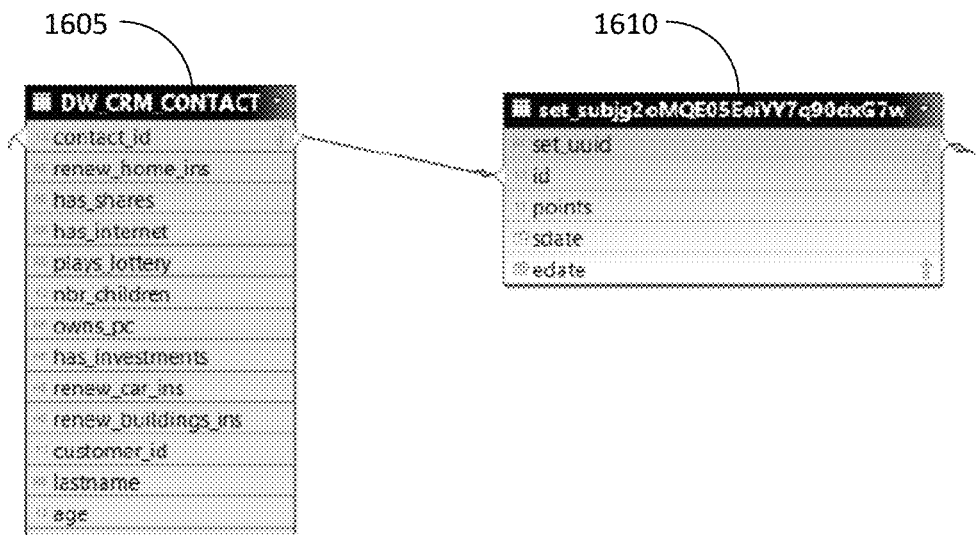

FIG. 16

```
private static SQLJoin adjoin (Universe universe),
                              IConnectionSolver solver,
                              List<Column> leftColumns,          ← 1705
                              List<CColumn> rightColumns) {
    DataFoundatuib dataFoundatuib = ((SQLBindingSet) universe.getBindingSets()).g //ADD JOINS
    ISQLJoinGenerator = JoinGenerator = JoinServiceFactory.createSQLJoinGenerator(
1710  SQLJoin newJoin = null;

try {
        List<String> expressions = joinGenerator.generatorSQLJoinExpressions (left
        newJoin = addJoinWithExpression(universe, solver, expressions.get(0));
    }
    catch(Exception ex) {
        System.out.println(ex.getMessage());
    } return newJoin
    }
                                                        ← 1715
    subjectJoin.setCardinality(Cardinality.CL_N);
```

FIG. 17

```
AliasTable aliasTable = DataFoundationFactory.eINSTANCE.createAliasTable();
String Pattern = "Alias of {0} ({1})";

aliasTable.setBusinessName(NLS.bind(pattern, originalTable.getBusinessName(), subjectName));
aliasTable.setAliasTable(originalTable instanceof SQLTable ? originalTable : ((AliasTable)origin
AliasHelper.registerAliasTable(aliasTable);
aliasTable.setDataSource(dataFoundation.getDataSource());
dataFoundation.getTables().add(aliasTable);

return aliasTable
```

FIG. 18

```
SELECT setinfo."set_identifier",
per.period_id,
per.period_sequence,
cal.calendar_name,
cal.calendar_grain,
cal.calendar_id
FROM set_cal x1bOQEGJEeuf5lz4jMFQ cal INNER JOIN set_pers1bOQEGJEeuf5lz4jMFQ per ON (
cal.calendar_id = per.calendar_id)
INNER JOIN (SELECT set_metadata.set_identifier,
set_metadata.calendar_id FROM set_metadata) setinfo ON (setinfo.calendar_id = per.calendar_id)
```

FIG. 20

```
DataFoundation dataFoundation = ((SQLBindings)universe.getBindingSets().get(0)).getDataFoundation();
DataFoundationFactory factory = DataFoundationPackage.eINSTANCE.getDataFoundationFactory();
DerivedTable derivedTable = factory.createDerivedTable();

if (originalPeriodInfo == null) {
    List<Column> columns = null;

DataFoundationService service = solver.getDataFoundationServices();

String sqlQuery;
    try { parseService.setSubDataSource(dataFoundation.getDataSource());
        sqlQuery = parseService.getDerivedTableParseSQL(dataFoundation.getDataSource(), expression );

columns = service.getColumns (cfProvider.getJob(), dataFoundation.getDataSource(), sqlQuery );
        true } catch (Exception ex) {
        throw ex;
    } string tokenizedSQL = service.getDerivedTableTokenizedSQL (expression, dataFoundation);

derivedTable.setBusinessName(tableName);
    derivedTable.setExpression(tokenizedSQL);

SQLParseResult result = EncodeDecodeHelper.encodeExpression(dataFoundation, expression, solver);
    if (result != null)
        derivedTable.setEncodeExpression (result.getEncodeExpression ());

derivedTable.getColumns ().addAll(columns);

derivedTable.setDescription(SETS_AUTOGENERATED_TABLE_TYPE);
    derivedTable.setDataSource(dataFoundation.getDataSource());
    DelimitationHelper.delimitTable(derivedTable, dataFoundation, solver);
```

FIG. 21

```
set_contact_membership.set_uuid = "Period Info MANUAL".SET_IDENTIFIER
AND "Period Info".START_DATE BETWEEN set_contact_membership.sdate AND
set_contact_membership.edate private static SQLJoin addJoinWithExpression(Universe univers,
    IConnectionSolver solver,
    String expression) {

DataFoundation dataFoundation = ((SQLBindingSet)universe.getBindingSets().get(0)).get(dataFou
    SQLJoin newJoin = null;

try {
        newJoin = DataFoundationFactory.eINSTANCE.createSQLJoin();
        JoinHelper.setJoinExpressionEx (datFoundation, newJoin, expression, solver);
        datFoundation.getJoins().add(newJoin);

}
    catch (exception ex) {
        System.out.println(ex.getMessage());
    }
    return newJoin;
}
```

*FIG. 22*

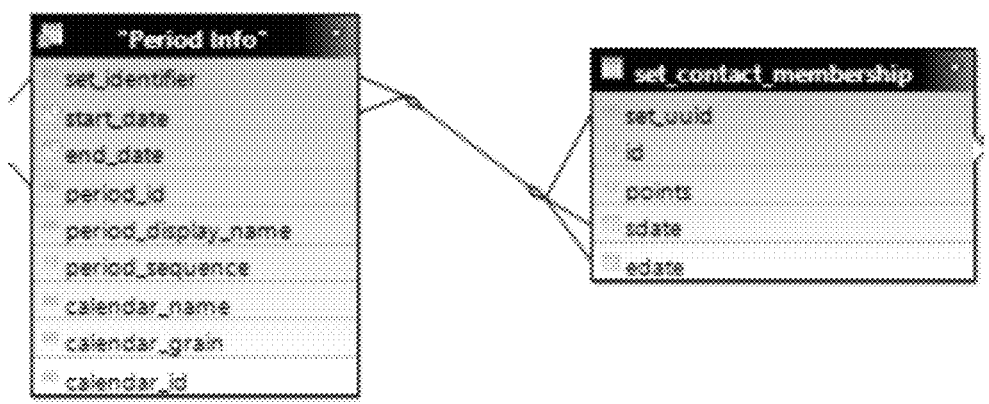

CREATE AT LEAST ONE DATA FOUNDATION TABLE, EACH OF THE AT LEAST ONE DATA FOUNDATION TABLES BEING CREATED FOR EACH OF ONE OR MORE SET TABLES IN A DATABASE BASED ON INFORMATION STORED IN A FIRST SET CONTAINER RELYING ON THE ONE OR MORE SET TABLES
2405

LINK THE AT LEAST ONE OF THE CREATED DATA FOUNDATION TABLES TO A CUSTOMER TABLE IN THE DATABASE, THE CREATED DATA FOUNDATION TABLE BEING LINKED TO THE CUSTOMER TABLE BASED ON A PRIMARY KEY FOR THE CUSTOMER TABLE
2410

STORE ALL OF THE CREATED DATA FOUNDATION TABLES IN A DEDICATED DATA STRUCTURE HOSTED BY THE FIRST SET CONTAINER
2415

*FIG. 24*

AUTOMATIC GENERATION OF DATA FOUNDATION FRAGMENTS

BACKGROUND

Enterprise software systems receive, generate, and store data related to many aspects of a business enterprise. This data may relate to sales, customer relationships, marketing, supplier relationships, inventory, human resources, and/or finances. Users may operate querying and reporting tools to access such data and display the data in useful formats, such as graphic visualizations and reports.

In some environments, a semantic layer universe may reside between an enterprise's data (e.g., a database) and the end users (e.g., customers). In some aspects, the semantic layer universe can include representations of the enterprise's data warehouse, including representations of real-world entities and processes. In some cases, the semantic layer universe might provide a mechanism to securely share the enterprise's data through a connection to one or more different querying clients. The semantic layer universe can be a valuable asset of the enterprise that can be used to generate insights into the operations of the enterprise. As such, constant maintenance of the integrity and security of the semantic layer universe may be vital to the enterprise. However, some users may have a desire to dynamically enhance capabilities of the semantic layer universe.

BRIEF DESCRIPTION OF THE DRAWINGS

FIG. 6 is an example embodiment of an illustrative flow diagram of an authoring process;

FIG. 8 is an example embodiment of an illustrative flow diagram of a querying process;

FIG. 13 is an example embodiment of sample code for creating a data foundation table;

FIG. 16 is an example depiction of a subject table joined to a customer table;

FIG. 17 is an example embodiment of sample code for specifying columns for a join;

FIG. 18 is an example embodiment of sample code for creating alias tables;

FIG. 20 is an example embodiment of SELECT statements related to derived tables;

FIG. 21 is an example embodiment of sample code to create a derived table;

FIG. 22 is an example embodiment of an illustrative statement describing a complex join;

FIG. 23 is an example depiction of a complex join in a data foundation;

FIG. 24 is an example embodiment of an illustrative flow diagram of a process.

DETAILED DESCRIPTION

Figure 1:
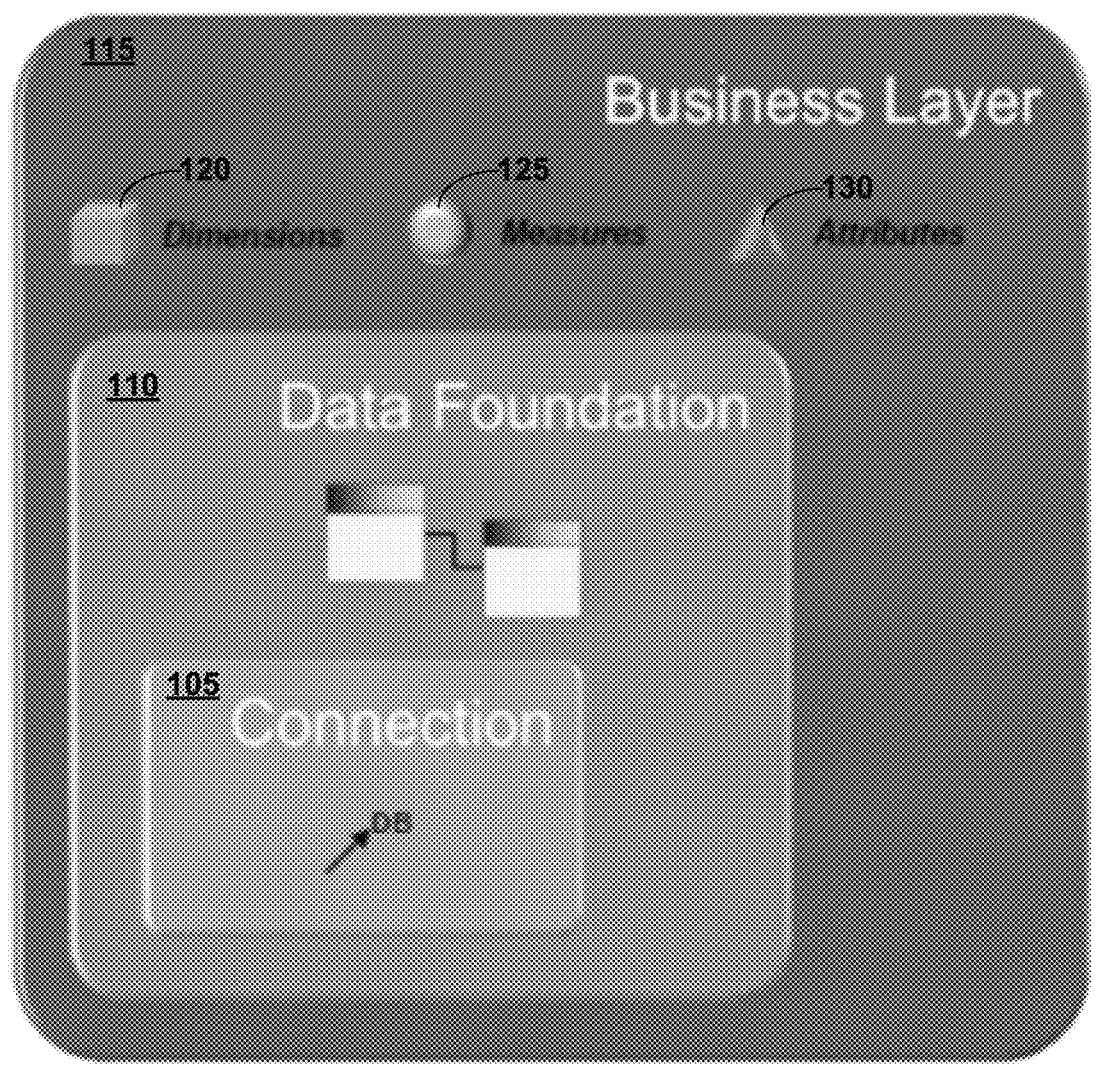
FIG. 1 is an example architecture for semantic layer authoring.

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

As used herein, a "Business Object" (BO) or simply "object" represents an aspect or feature of a real-world entity (e.g., company, person, product, process, a key performance index (KPI) for an area of an organization or business, etc.) and is mapped to specific data structures (e.g., table columns) in an underlying data source such as a database. A BO is a semantic entity, such as "Year", "Region", "Product", "Customer", etc. that represents a logical way of categorizing and grouping data for meaningful analysis of a business area or activity. A BO data structure can include fields with attributes and metadata associated with and defining the attribute fields. In some aspects, the BO refers to the specific collection of data according to the data structure (i.e., an instance of the BO data structure) that is stored in the database.

A "repository" may refer to a database used to store enterprise (i.e., organizational) platform information, such as user, server, folder, document, configuration, and authentication details.

A Semantic Layer (SL) herein refers to a representation of an organization's data that facilitates end users accessing the data autonomously using common understandable terms. A semantic layer may map complex data to familiar terms such as, for example, "product", "customer", or "revenue" in an effort to offer a unified, consolidated view of data across the organization that users can access without having a need to know the intricacies and complexities of the database, including its schema. The data and metadata (that is, objects) that comprise the semantic layer may be retrieved from a database and form a "semantic layer universe". As used herein, a semantic layer universe (also referred to simply as a "universe" and "UNX") is an abstraction of a data source that maps complex data into descriptive terms used across the organization. Some examples include, "Product," "Customer," "Region," "Revenue," "Margin", and "Costs". The universe resides between an organization's database(s) (or other data sources) and end-users such as customers, and isolates the end users from the technical details of the database(s) where source data is stored. Consistent with other terms herein, semantic universes include objects that are grouped into classes (and subclasses) that are mapped to the source data in the database and may be accessed through queries and reports. A "universe editor" refers to a dedicated User Interface (UI) that provides a mechanism to allow a specific role among users (universe designers) to design universes.

As used herein, a "set" refers to a semantic entity defining one or more steps to follow (i.e., a method) to produce, for example, a list of unique and homogeneous data-mart identifiers (Customer IDs, Product IDs, Transaction IDs, etc.). A set is created on top of BOs, including the data (e.g., fields and attributes) and metadata associated therewith. A set may include other aspects or features, in addition to the one or more BOs on which it is created or based. A "set container" refers to a structure hosting a number of sets, possibly among other entities, for performance and administrative purposes. A "set designer" refers to a role aimed at designing and publishing sets and a "sets editor" refers to a dedicated UI that allows set designers to design Sets.

In some aspects herein, the term "secured universe" is used. A secured universe refers to a transient version of a universe that might be generated for end users' purposes. The secured universe restricts what a given user can see and manipulate according to the credentials the user provides when logging into a system.

A "query" is used to retrieve a collection of BOs (i.e., "objects") based on specific criteria. In some embodiments, an inquiry or query is converted by an application, service, or server (e.g. a BusinessObjects server) to SQL or other language statements appropriate to query the database. The SQL (or other language) query is sent to the database to retrieve the data mapped to the objects referenced and relevant to the query. A collection of criteria that restricts the type and/or number of records returned as a query result is referred to as a "filter". In some aspects, a filter defines a sub-set of data to appear in a query's result list. Some embodiments herein may include a "query panel" (QP). A QP refers to a UI, possibly dedicated, that provides a mechanism to allow end users to define queries. The QP may also present a view of the Universe to the end user.

FIG. 1 is an example of a logical depiction of an architecture overview 100 for the authoring of universes, in some embodiments. In some aspects, universes may be authored in a hierarchical manner (i.e., like "nesting dolls") where successive layers build on top of lower layers. A connection layer 105 provides access to a database (i.e., data source), and may include, credentials, schema, and (optional) connections strings for connecting to the database. A Data Foundation (DF) layer 110 contains one or more tables (e.g., 112, 114) and joins (e.g., 113) from the database (i.e., data source(s)) accessed by the connections specified by connection layer 105. Joins are used to combine tables in DF 110 and define how data is queried in the tables therein. In some aspects, DF 110 may import database tables into an authoring model herein, and further enrich the schema thereof with particular table types, loins, calculated columns, prompts, and other artifacts. A Business Layer (BL) 115 is built on top of DF 110. BL 115 includes metadata objects, such as dimensions 120, measures 125, attributes 130, etc. BL 115 can be used to create business-oriented objects for consumption in, for example, reporting tools. In some aspects, each "layer" in FIG. 1 builds on top of the layer(s) below it, while having no knowledge of the layer(s) above it.

Figure 2:
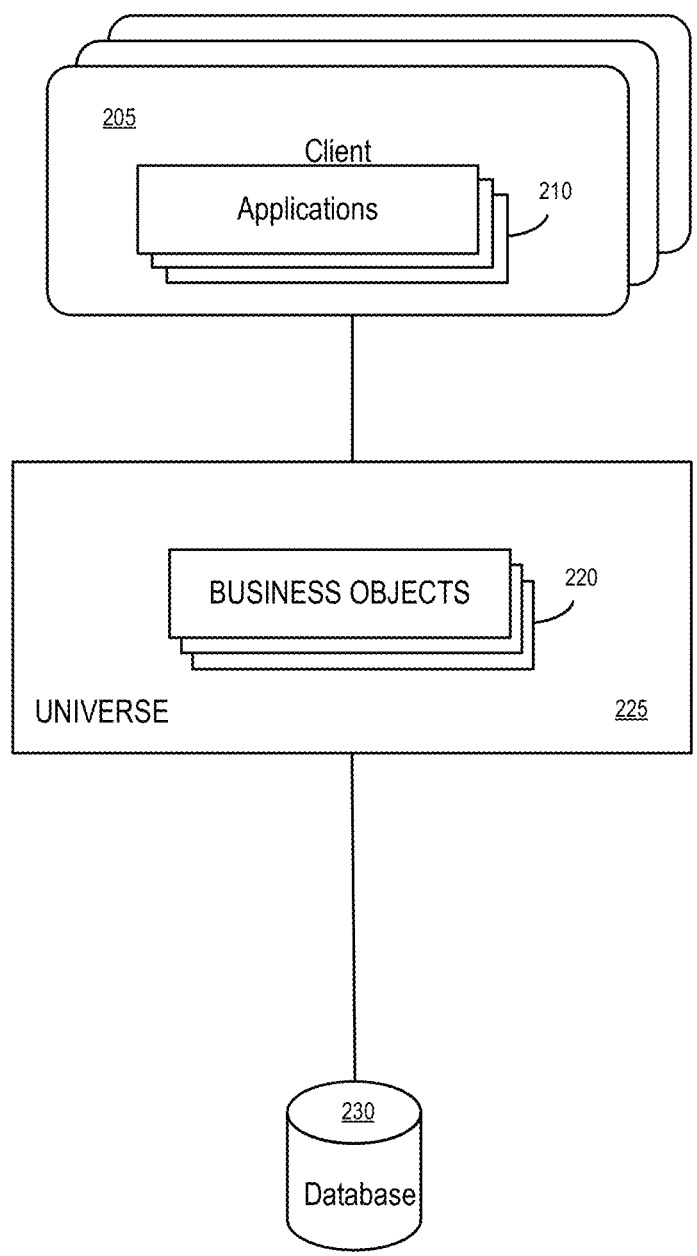
FIG. 2 is an illustrative schematic diagram of a system.

FIG. 2 is an illustrative block diagram of an architecture or system 200, in one example. Examples of some embodiments of the present disclosure are not limited to the particular architecture 200 shown in FIG. 2. System 200 includes one or more client devices 205 running one or more applications 210. Applications 210 may, in some embodiments, include a suite of different software applications having, at least to some extent, related functionality, similar user interfaces, and some ability to exchange data with each other. Applications 210 may include different software applications that support the operations and process of an organization.

System 200 includes a semantic layer universe 225 comprising a plurality of business objects (BOs) 220. Universe 225 is logically located between an enterprise's or organization's source of data stored on data store 230 (e.g., an in-memory database) and a consumption level including clients 205 where users can create queries via, for example, user interfaces, UIs, (not shown in FIG. 2) of the applications 210 executing, at least in part, on the clients.

Universe 225 is an abstraction of data source 230 that maps complex data into descriptive terms used across the organization. Some example terms include "Revenue", "Margin", and "Costs". Universe 225 is separate and distinct from the data source 230. Universe 225 includes objects (e.g., "Product", "Customer", and "Region") that are grouped into classes and mapped to the data in the database 230. The data in database 230 may be accessed using, for example, plain language names, through queries from applications 210. Universe 225 may be created or authored by a "universe editor" (not shown). The universe editor may include a UI that provides a mechanism for a user to design universes using, for example, drag-and-drop techniques to interact with graphical representations thereon.

In some aspects, a universe administrator or other authorized entity in defining a universe may consider and attempt to anticipate what data features, access, and relationships end users/consumers may want and need. After defining the objects and constraints of a universe, the universe administrator may author and publish the universe so the end users can see, access, and use it to interact with the database supporting the universe.

In some aspects, universe 225 may be used by the different applications 210, where applications 210 may correspond to different applications or services offered by a software provider. As such, the data representations of universe 225 may be a valuable asset and aspect to the on-going functionality of an associated organization, including objects representing operational and analytical processes of the organization.

In some aspects, it can be vital that the integrity and accuracy of universe 225 be securely maintained. In some embodiments, universe 225 may be read-only by users, thereby preventing users from changing data that might be critical or relevant to an enterprise and parts thereof. Universe 225 may however be modified by an entity having a sufficient security clearance to making changes thereto such as a universe editor (not shown). In some embodiments or contexts, a universe may be periodically updated or otherwise modified to reflect changes to the organization and/or its processes and methods of operation. However, a universe might be modified occasionally, about, in some instances, once every three to six months.

In one example, a client 205 executes an application 210 to present a query panel (QP) via a user interface (UI) to a user on a display of client 205. The user manipulates UI elements within the UI to indicate a query by selecting one or more graphical representations of BOs, where a server or service embodying universe 225 operates to generate one or more SQL statements that are sent to database 230. Database 230 may execute instructions corresponding to the SQL statements to generate query results (i.e., data mapped to the objects selected by the user). The query results may be presented to the user in a view including, for example, a report, a dashboard, or other record.

Data store 230 may comprise any data source or sources that are or become known. Data store 230 may comprise a relational database, a HTML document, an eXtendable Markup Language (XML) document, or any other data storage system storing structured and/or unstructured data files. The data of data store 230 may be distributed among several data sources. Embodiments are not limited to any number or types of data sources.

Data store 230 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 3:
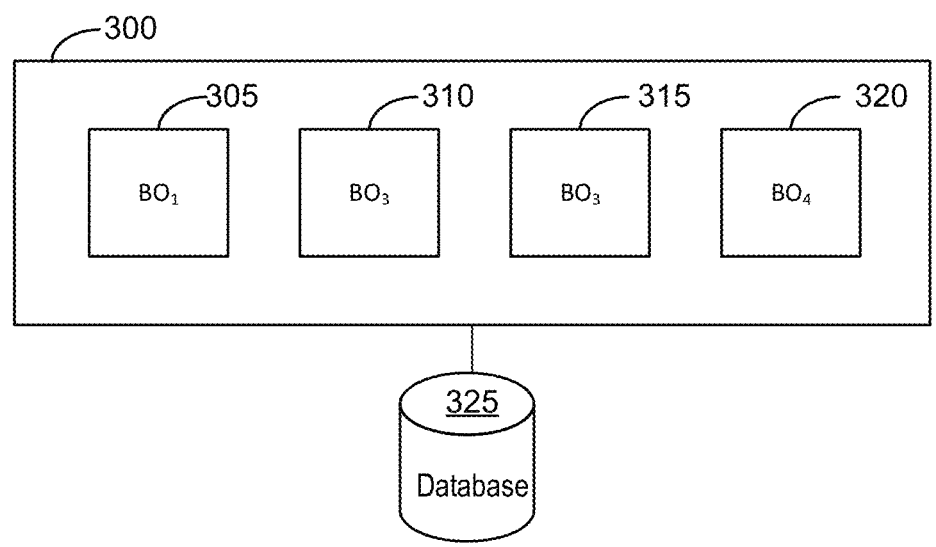
FIG. 3 is an example schematic embodiment of a semantic layer universe.

FIG. 3 is an illustrative depiction of a semantic layer universe 200. Universe 300 may be created (i.e., authored) by a universe designer or other authorized entity via a universe editor UI tool, feature, application, or service. Universe 300 includes, by way of example, BOs 305, 310, 315, and 320. Each of the BOs in universe 300 are representations of model-based data structures having fields and attributes, where each BO is defined by metadata associated therewith. Universe 300 is a metadata semantic layer and does not itself contain data. The data corresponding to the BO representations in the semantic layer universe 300 is stored in a database (e.g., FIG. 1, 130) or other data store. Reference numeral 325 refers to a database, database management system, an instance of a database node, or other data source storing the data mapped to BOs 305, 310, 315, and 320. FIG. 3 is a simplified example of a universe and specific implementations of a universe may include thousands of BOs representing different aspects of an enterprise.

In some contexts, a user or other entity may want to enrich an existing or new universe (e.g., 225) to include innovations such as, for example, additional or different methods and data representations and relationships not offered by an organizations' semantic layer universe. In some example embodiments, the innovations may occur rather frequently as compared to the lifecycle of the universe and may further relate to a specific subset of applications 110 and/or users thereof. In some aspects, a "set" may be created by a user (e.g., a set designer working to implement desires of end users) to define a method to produce, for example, a list of unique and homogeneous data-mart identifiers (Customer IDs, Product IDs, Transaction IDs, etc.). The set is created on top of the BOs of universe 125, where the set is also a semantic entity and includes at least some aspects (e.g., fields, attributes, methods, and metadata) of the objects of the universe. A set herein may include other aspects or features, in addition to the one or more BOs (or parts thereof) on which it is created or based. In some aspects, the set may be updated or created on a daily or even shorter timeframe.

Figure 4:
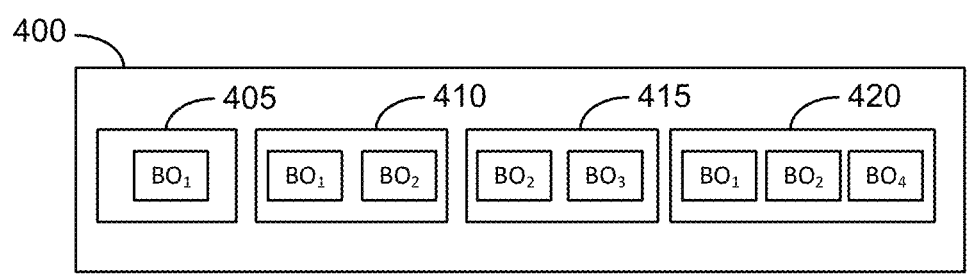
FIG. 4 is an example schematic embodiment of a semantic layer set.

FIG. 4 is an illustrative example of semantic layer sets or simply "sets". In the example of FIG. 4, the depicted sets include set 405, set 410, set 415 and set 420. Each set is defined and created on top of one or more objects (i.e., BOs) from the universe that it is associated with. The sets of FIG. 4 are associated with universe 300 of FIG. 3. As such, each set in FIG. 4 is created on top of or is based on one or more of the BOs of universe 300. As depicted in FIG. 4, set 405 is created on top of BO1 from universe 300; set 410 is created on top of BO1 and BO2 from universe 300; set 415 is created on top of BO2 and BO3 from universe 300; and set 420 is created on top of BO1, BO2, and BO4. As used herein, a set that is created on top of a BO means that the set includes at least some of the characteristics (e.g., fields, methods, and attributes) of the underlying BO, as well as the associated metadata of the BO. In some embodiments, the underlying BO may be unaltered, whereas the underlying BO may be altered in some embodiments (e.g., some attributes not used or changed). The sets in FIG. 4 are further shown as being grouped together by a set container 400. The example of FIG. 4 illustrates one set container including four sets. A universe may have multiple set containers linked or associated therewith, as defined by a repository relationship.

Figure 5:
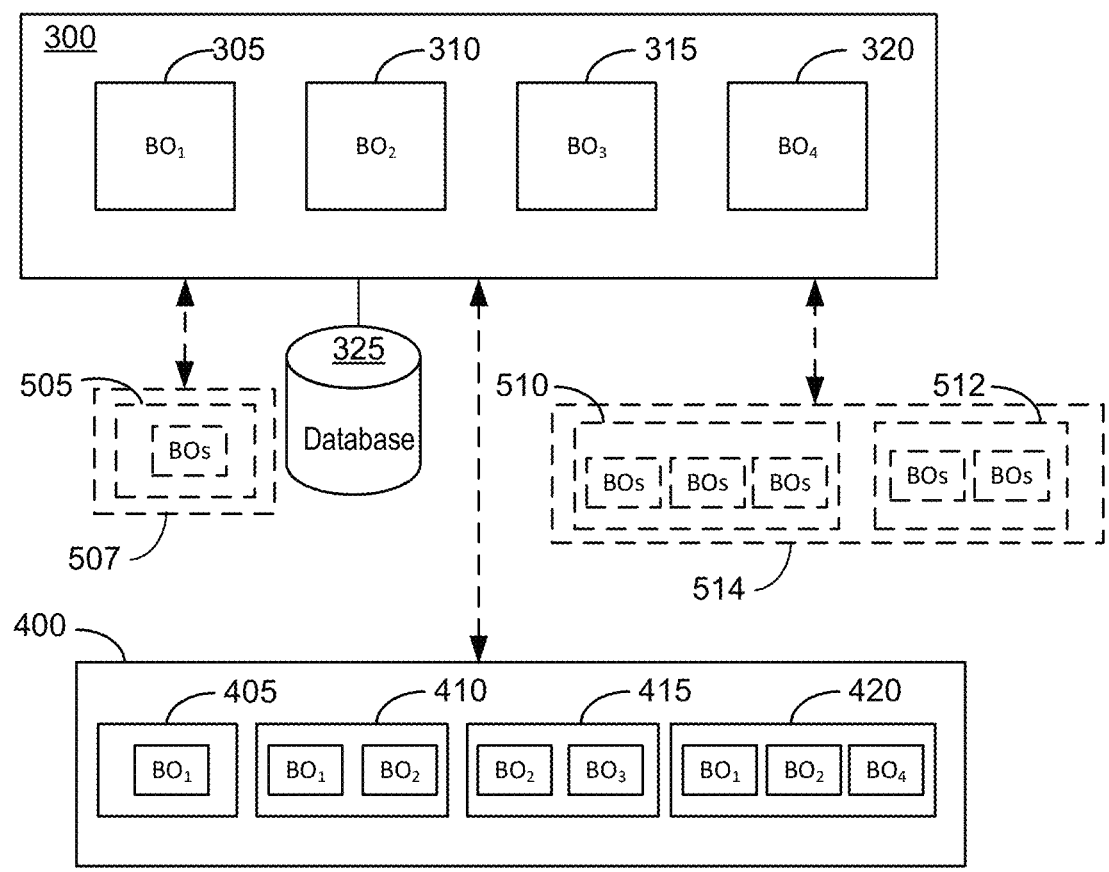
FIG. 5 is an example schematic embodiment of a consolidated semantic layer universe.

FIG. 5 is an illustrative depiction of a semantic layer universe 200 and the set container 400 being linked together by a repository relationship, as depicted by the dashed line arrow between the universe and set container 400 including sets 405, 410, 415, and 420. The repository relationship defines the connection or association between universe 300 and the sets 405, 410, 415, and 420 included in set container 400. FIG. 5 further illustrates that universe 300 may be linked to one or more set containers, each including one or more sets that in turn are created on top of one or more objects of the universe. As illustrated in FIG. 5, semantic layer universe 300 is further linked to set containers 507 and 514, where set container 514 includes sets 510 and 512 and set 505 is included in set container 507. In the example of FIG. 5, set containers 507 and 514 and the contents therein are depicted as dashed lines to further indicate that these set containers are newly created extensions of semantic layer universe 300.

In some aspects, including but not limited to security concerns and an incompatibility in lifecycles, a universe and one or more sets relating thereto might not be merged. For example, enhancements and features that might be desired by some users and not included in a semantic layer universe might not be added to the universe at an authoring level of the universe where the universe is created and published. However, in accordance with some example embodiments herein, features enabled by one or more (new) semantic layer sets may be consolidated with a universe to add, from a user's perspective, the technical features and enhancements of the one or more sets to the universe at a consumption level where the user creates a query of a database via the universe.

FIG. 6 is an illustrative flow diagram of an example process 600 for authoring extensions to a semantic layer universe. At operation 605, a universe is published to expose its objects (as defined herein) to another entity, application, service, or system. The semantic layer universe of operation 605 may include one or more of the characteristics disclosed herein and the objects of the universe may be associated with a data source such as a database (e.g., an in-memory database).

Operation 610 includes creating set containers that may be linked to the semantic layer universe published in operation 605. In some instances, a set designer may create one or more set containers at operation 610, where the set containers are semantic layer entities that are separate and distinct from the semantic layer universe 300. Operation 610 is directed to the creation of the one or more set containers. As such, the set containers do not yet include any sets. As a repository resource itself, a set container may have a level of security applied to it.

Proceeding to operation 615, the semantic layer universe published at operation 605 may be linked to or otherwise associated with one or more of the set containers created at operation 610. In some embodiments, the universe and the set containers may be linked to each other via repository relationships defining a dependency therebetween. The repository relationships may be expressed in metadata that may be stored in a location separate and distinct from the universe.

At operation 620, sets are created on top of the universe's BOs. The sets are also a semantic layer entity and may represent collections of data (e.g., methods, entities, etc.) that differ from the BOs of the universe from which the sets' BOs are derived. In some embodiments, sets may be designed by a set designer using a dedicated sets editor that is a design tool strictly for defining sets. In some embodiments, only BOs available to the set designer in accordance with their role and security privileges can be created by a given set designer. The sets generated at operation 620 may be grouped into the one or more set containers linked to the universe at operation 615. The sets can be published for viewing and usage as being grouped into set containers. The set(s) are a semantic entity and are not stored in the universe, rather the sets are stored elsewhere.

Process 600 may, in some embodiments, include all of the operations shown in FIG. 6, include fewer than all of the operations of FIG. 6, and comprise a portion of another process.

Figure 7:
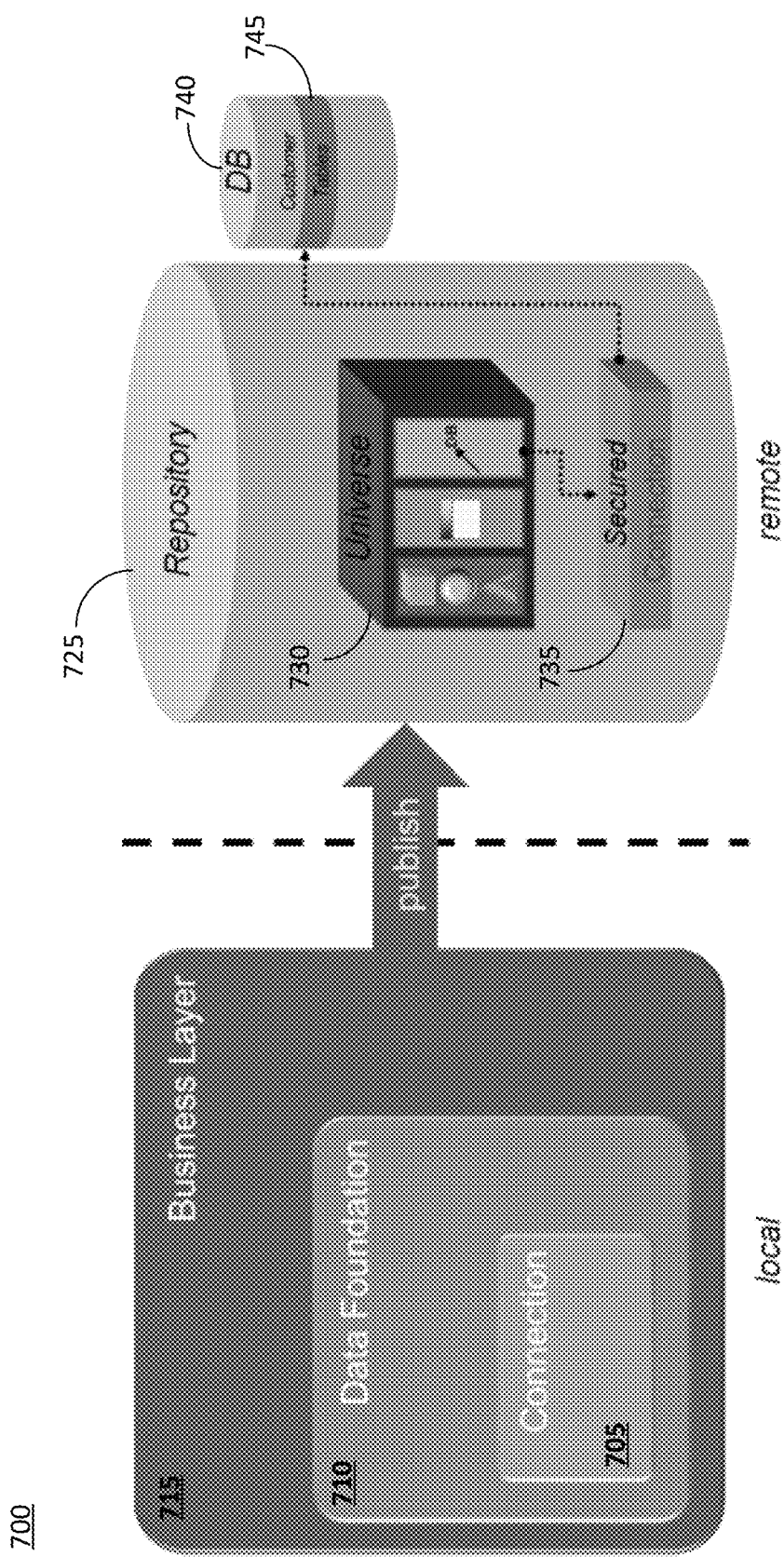
FIG. 7 is an example architecture including a consumption universe.

FIG. 7 is an example logical depiction of an architecture overview 700 for the publishing of universes, in some embodiments. In some aspects, in order to be published local files (e.g., connection 705, DF 710, and BL 715) may be packaged into a single InfoObject 720 exposed as a secured consumption universe. By publishing universe 730, connections(s) 705, DF 71, and BL 715 are exported to repository 725, where they may be accessed by reporting tools. A transient version of universe 730 may be generated for consumption purposes via a secured connection 735 and stored as customer tables 745 on database 740.

FIG. 8 is an illustrative flow diagram of an example process 800 for querying a semantic layer universe and extensions thereof (i.e., semantic layer sets linked to the given universe). At operation 805, a determination is executed to ascertain the set containers, if any, linked to the given universe. Operation 805 and process 800 may be invoked or triggered in response to a query of the given universe. The query may be initiated by an end user interacting with a system (e.g., system 200) via a UI query panel (QP). In some embodiments, some aspects and characteristics of the universe, such as repository relationships of the universe to be queried, can be examined to determine all of the set containers linked to the universe.

At operation 810, the set containers available to the querying entity based on that entity's role and corresponding security access levels or privileges are retained. Set containers not available due to security constraints may be discarded from further consideration with respect to the current query. Operation 815 further includes retaining the BOs in the set containers retained at operation 810 that are allowed based on the querying entity's role and corresponding security access levels or privileges. The BOs not available due to security constraints may be discarded from further consideration with respect to the current query. At operation 820, the allowed set(s) available to the querying entity based on that entity's role and corresponding security access levels or privileges are retained. At operation 820, the allowed sets will include the allowed BOs as determined at operation 815. The allowed set(s) will be retained and the other, non-allowed set(s) can be discarded from further consideration with respect to the current query.

At operation 825, a consolidated view of the relevant BOs and allowed set(s) may be presented to the end user that invoked the query. In some instances, the consolidated view is presented in a UI of the tool, application, or service that provided a point of interaction for the end user to initiate the query.

According to process 800, appropriate set containers of a given universe are collected at the semantic layer level based, at least in part, on the repository relationships of the given universe at the time the query is initiated and presented to the system. Further, the relevant sets are consolidated with the relevant BOs of the given universe for consumption of the end user. This consolidated universe including the semantic layer aspects of the relevant set(s) is transient and is referred to herein as a secured universe. The secured universe, as illustrated by the operations of FIG. 8, can restrict the view presented to the end user to include reflect the security privileges of the user.

Process 800 may, in some embodiments, include all of the operations shown in FIG. 8, include fewer than all of the operations of FIG. 8, and comprise a portion of another process.

In some aspects, an end user may be presented with a view of the consolidated universe that is extended to include the security-cleared sets. In some embodiments, an end user may see the features, methods and other data representations (e.g., a new BO created in a newly created set). However, whether the features or methods are part of the universe created during a universe creation phase or part of a universe consolidation generated dynamically at the time of a query execution may not be revealed or otherwise indicated to the end user.

In some embodiments, the consolidated, secure universe is generated dynamically when needed (i.e., in response to a query). The consolidated or merged universe including the original universe and the relevant set(s) may be stored separate and apart from original universe. The merged universe may be implemented as an in-memory copy, decoupled from the original universe. In some aspects, the sets may be viewed as "filters".

Figure 9:
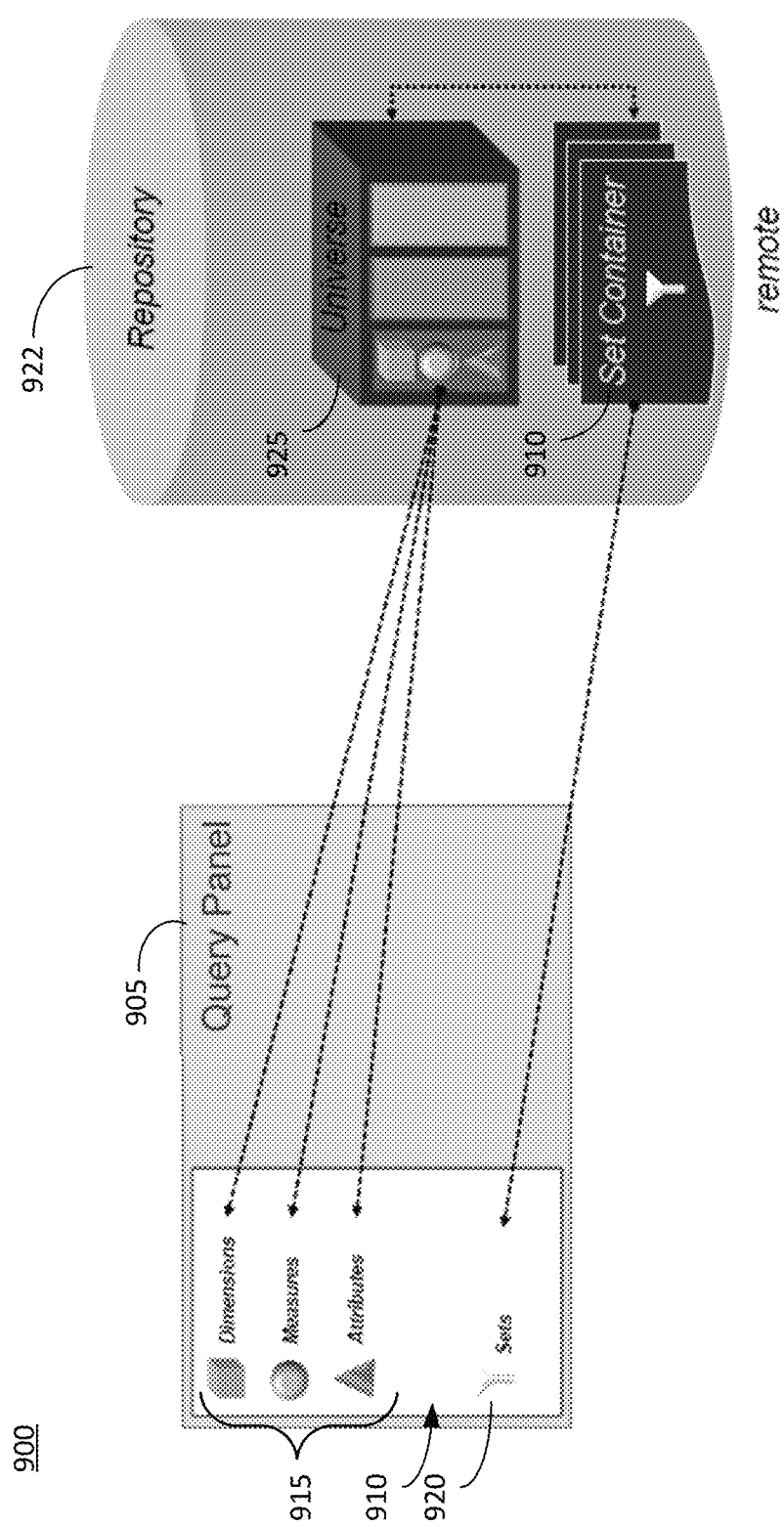
FIG. 9 is an example architecture including an external augmentation.

FIG. 9 is an example of a logical depiction of an architecture overview 900 that may relate to external augmentation aspects, in some embodiments. In some aspects, when a user interface such as, for example, a Query Panel (QP) 905 is opened in a reporting tool, an aggregated view 910 of a secured (i.e., transient) universe's 925 objects 915 and sets 920 of set container(s) 930 on a remote repository 922 may be displayed to an end user (e.g., a customer), wherein a reconciliation of the objects 915 and the sets 920 occurs on-the-fly at runtime.

Figure 10:
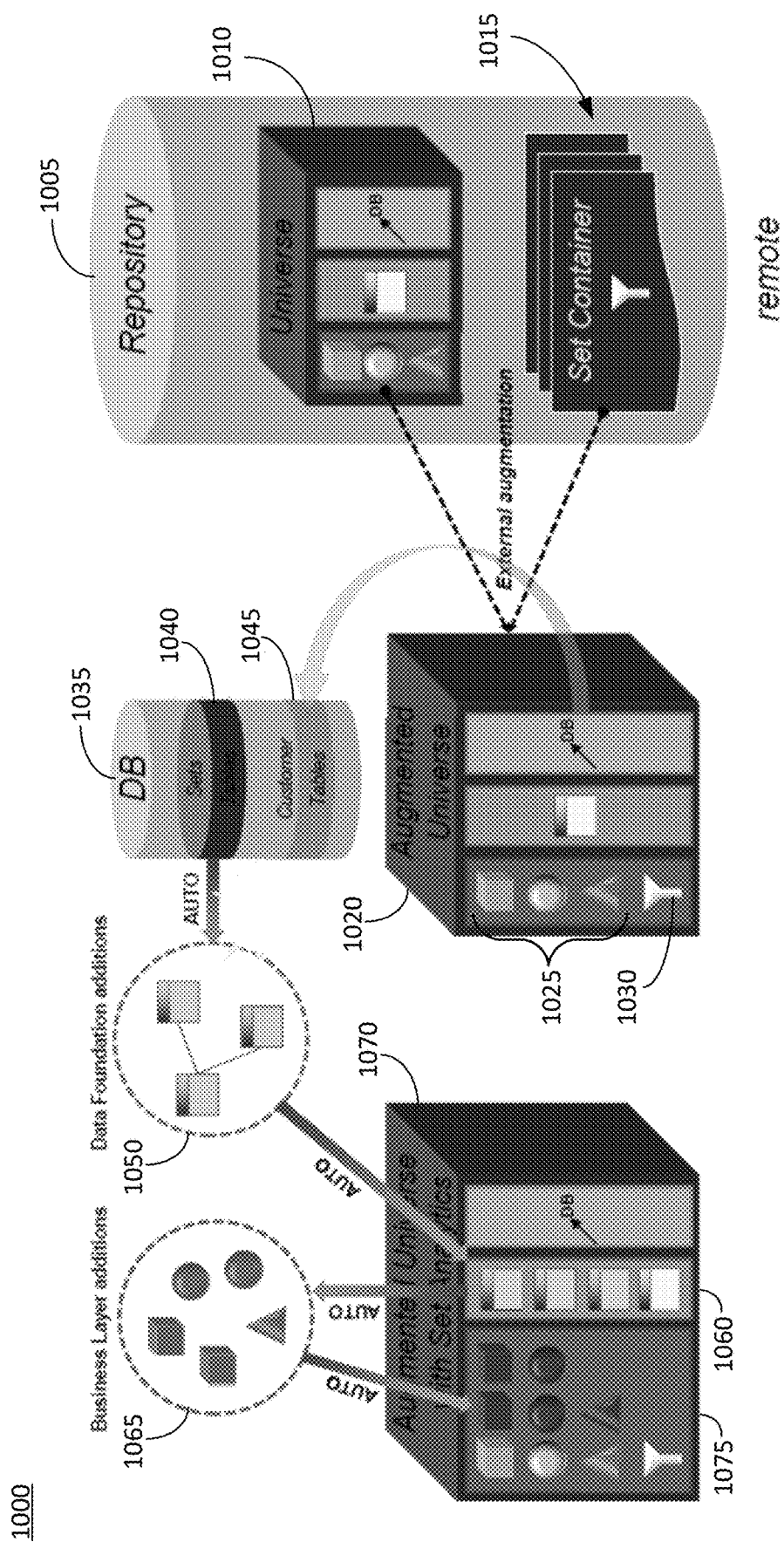
FIG. 10 is an example architecture of a platform supporting augmented universes with set analytics.

FIG. 10 is an example of a logical overview of an architecture or platform 1000 relating to methods and systems for augmentation of a universe with set analytics, in some embodiments. In some aspects, platform 1000 includes a repository 1005 having a universe 1010 and set container(s) 1015 that each contain one or more sets. As discussed above (e.g., FIG. 9), an augmented universe 1020 including objects 1025 and sets 1030 may be generated based on universe 1010 and set container(s) 1015. In some embodiments herein, it might be possible or otherwise permissible to write-back sets-specific tables 1040 on to a user (i.e., customer's) database 1035, where database 1035 also stores customer tables 1045. In some aspects herein, sets-specific tables 1040 might be used to automatically generate (e.g., without intervention and/or assistance from a customer/user) pre-packaged or predetermined (i.e., "pre-canned") analytics based on the sets-specific tables 1040. In some aspects, the automatically generated analytics might be generated on the basis of DF additions 1050 or fragments being automatically generated based on sets-specific tables 1040. The DF additions 1050 may be automatically injected into the universe at 1060, where Business Layer additions 1065 may be automatically generated based on DF additions 1050 and further injected into the universe 1075 to obtain augmented universe with set analytics at 1070. As illustrated, objects 1075 of the augmented universe with set analytics 1070 includes the dimensions, measures, attributes, and sets further automatically generated based on the sets-specific tables 1040 and the DF and BL additions automatically generated based thereon. Details related to various aspects of FIG. 10 are disclosed in greater detail hereinbelow.

In some aspects, the BL objects 1075 generated as illustrated in FIG. 10 may be created based on sets tables 1040 by a developer, administrator, vendor, supplier, or other entity provider of remote repository 1005, wherein a schema of a customer or user's database may be leveraged to store the set-related objects. These set-related objects or artifacts provisioned by the developer or administrator might be used and queried by the customer, in some instances similar to the customer's own data tables (e.g., 1045). In some instances, the customer might be able to query their own data, as well as the objects provisioned by the developer.

In some aspects, features disclosed herein may provide mechanisms for automatically providing business objects representing pre-determined analytics to a customer or other user.

In some aspects, sets may store some metadata and membership data in a customer's database. A process referred to as materialization may issue data manipulation language (DML) and data definition language (DDL) SQL on the customer specified database to generate membership (i.e., lists of IDs) for each defined set. This data is stored in dedicated tables created automatically by the system.

For a customer to consume these tables in a Query Panel (or other reporting tool user interface), one would typically need to add the tables to their DF, as well as fully understand how these tables are related to their own (i.e., customer) tables. Best or suggested practices would also suggest that such process(es) ensure that no loops or other ambiguities are created and that the integrity of the DF is maintained. Additionally, relevant and meaningful Business Objects (BOs) would need to be created based on these set tables.

In some regards, this might be a complex and time-consuming process. Some embodiments herein operate to alleviate this complexity by auto-generating the DF and BO's and providing access to the same to a customer, thereby, in some instances, providing a mechanism for a customer to access the set metadata and membership in a QP (or other reporting tool interface) to assist in creating analytics.

In some aspects, a set container is fully aware of what tables it contains or owns and stores this information internally. This table-related information is stored so the system can continue to manipulate (e.g., Insert, Update, Delete, etc.) the data and tables as needed.

Figures 11, 12:
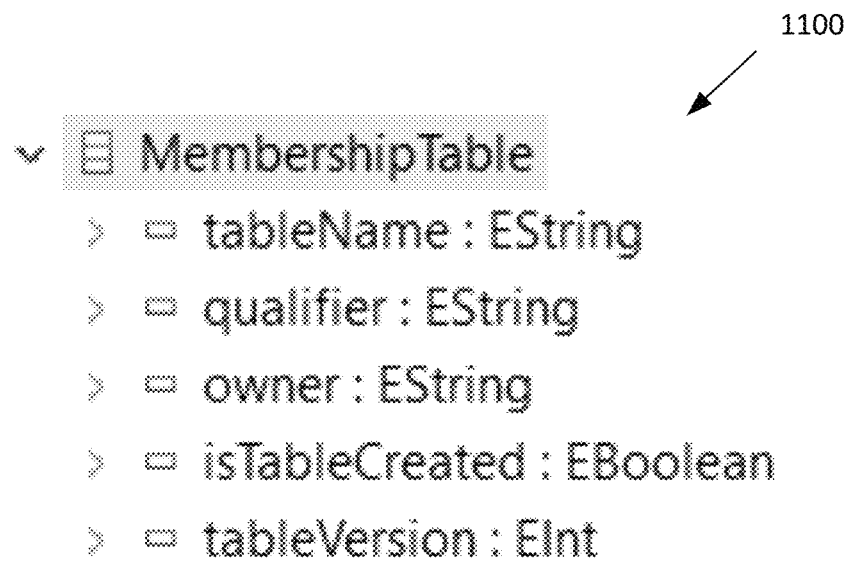
FIG. 11 is an example embodiment of container set information.
FIG. 12 is an example embodiment of container set table description.

FIG. 11 is an illustrative depiction of information 1100 a set container might store for each table it owns. In addition to specifying a name, qualifier, owner, indication of table version, and other information, each table may have a specific structure based on the data it might store. The specific structure may be specified by, for example, a table description "TableDesc". An example format for TableDesc for a set table is illustrated in FIG. 12. The table information outlined in FIGS. 11 and 12 may be used to add the sets tables included in a set container to a customer's DF.

In some embodiments, a DF table may be created for each set table based on the information stored in a set container and describing the set tables therein. In some embodiments, a process for creating a DF table is performed automatically based on the stored information, without intervention or assistance from a customer. FIG. 13 includes example code 1300 that might logically create a DF table for each set table in a set container. The code 1300 might be executed to automatically generate DF tables based on the knowledge of each set table (e.g., schema, etc.), as represented by the stored set container information. As seen, sample code 1300 includes statements to create, when invoked, a DF table, including specifying the columns therein based on what is in the customer's database. In some aspects, depending on a connectivity used, the DF table being created may have to be delimited, as seen at 1305. The delimitation of a table determines whether the connection server specifies it delimits the table.

Figures 14, 15:
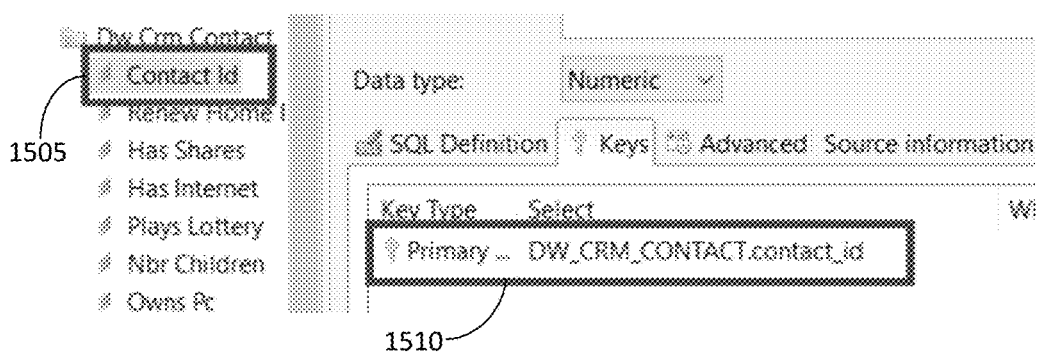
FIG. 14 is an example embodiment of sample code for creating a TableView.
FIG. 15 is an example embodiment of a user interface illustrating a Primary key for a Business Object.

While FIG. 13 includes an example of code to create a DF table, FIG. 14 includes an illustrative example of code to create a corresponding user interface (UI) aspect (e.g., TableView) to surface, when executed, the metadata of a created DF on a display screen. Without a TableView, the DF tables will not be visible in, for example, a DF editor.

In some aspects, a DF table includes the metadata that is bound to a customer's database schema, while the TableView is the UI aspect that surfaces the DT table on a display screen.

As an example, a table in a customer's DF might appear in a MasterView, as well as a secondary view. The secondary view might be a Geography view. The Geography view might only show tables that are bound together by a geographic meaning or definition. Yet another view might be a "Products" view, wherein only tables having a products relationship are shown. In this present example, a table "Country" might be presented in three different views, including a MasterView, a GeopgraphyView, and a ProductsView. Depending on a context, the one table "Country" can appear in different contexts. A TableView created for each context addresses the UI graphical aspects corresponding to the table "Country".

In some embodiments, particular tables referred to herein as "Subject" tables are used to store all set membership based on a specific subject. These tables are important as they are the only set tables to join directly to a customer table(s). Other set tables might have internal relationships. Subject tables provide a mechanism to link DF tables to a customer's table.

A customer defines the Subject based on what category of sets they would like to build, for example, sets based on "customers" or "products". In some aspects, one or more BO's may be part of a Subject, where each BO is bound to a Primary key column in the DF. As an example and referring to FIG. 15, the "Customer" Subject will contain a BO 1505 called "Contact Id", which is bound to Primary key column "contact_id" 1510 from a table in the DF.

Based on an identified/determined subject BO for a customer database, the Subject table can be joined to the correct Customer table. A set table is joined to the primary key column of a customer table, where the customer has defined the primary key for their table. In the example illustrated in FIG. 16, a join is shown between the Customer table 1605

(i.e., "DW_CRM_CONTACT") and the automatically generated subject table 1610 (i.e., "set_subjXXXXXXXXX"). Moreover, based on the internal schema depicted in FIG. 15 "id" must connect to the customer's schema by "contact.id" based on the Primary key information shown.

In the example code shown in FIG. 17, the left columns and right columns are specified for the required join at 1705. Thereafter, a join is generated at 1710 between the Customer table and the subject table, including setting the cardinality of the join at 1715. It is noted that this process is completed for every subject defined by the customer. In some aspects, one join is sufficient per subject (e.g., three subjects can be joined by three joins).

Set tables other than Subject tables (i.e., other tables) are created in a same way as the subject table, but the joins are all defined between the set tables and not to external customer tables (e.g., a subject table). Given the joins between the set tables are internal to sets and do not change, joins of the other tables (i.e., tables other than Subject tables) can be programmatically created as needed.

In some aspects, a process of creating joins for set tables other than a Subject table may be the same as or similar to the process disclosed for a subject table. However, a difference does exist because a different list of left columns and right columns is specified to create the join depending on the known structure and connections between set tables. The structure and internal connections between the other set tables is fully known by a developer, administrator, etc. since they "own" all of the other set tables, in contrast to the Subject table scenario.

In some aspects, a consistent set or cluster of tables (i.e., other tables) may be created and then this set of tables may be attached to the customer's table with one join from a created Subject table.

In accordance with some design practices and/or quality controls, loops might be avoided in the design of the DF by ensuring all paths within the DF are well defined so there are no ambiguities. Adhering to this design principle, may be particularly important in the context of auto-generating the DF, in some embodiments herein.

While there is one table per subject in some embodiments, the other tables that store metadata related to sets may be shared by all subjects. This aspect might cause loops between subjects, leading to errors in the DF and query generation. For example, multiple subjects might join to the same metadata tables, thereby causing an ambiguity.

In some embodiments, potential ambiguities may be addressed by using Alias tables to avoid loops, where the Alias tables seamlessly integrate with any existing customer design. Loops may be avoided by having a first subject that generates joins directly to the core metadata tables. Thereafter, subsequent subjects will join to alias tables of these core metadata tables and thereby avoid direct loops.

In some aspects, a table may be present just once. For example, a set "history" is created for a first subject. Here, no alias is needed. For a second subject, we again need to refer to the set "history". Since the set "history" is already present, an alias may be created to avoid a loop by joining to the set "history" again. The thus created alias of the set "history" may be referenced by the second subject. In some instances, additional aliases may be generated to accommodate additional subjects and avoid loops.

Figure 19:
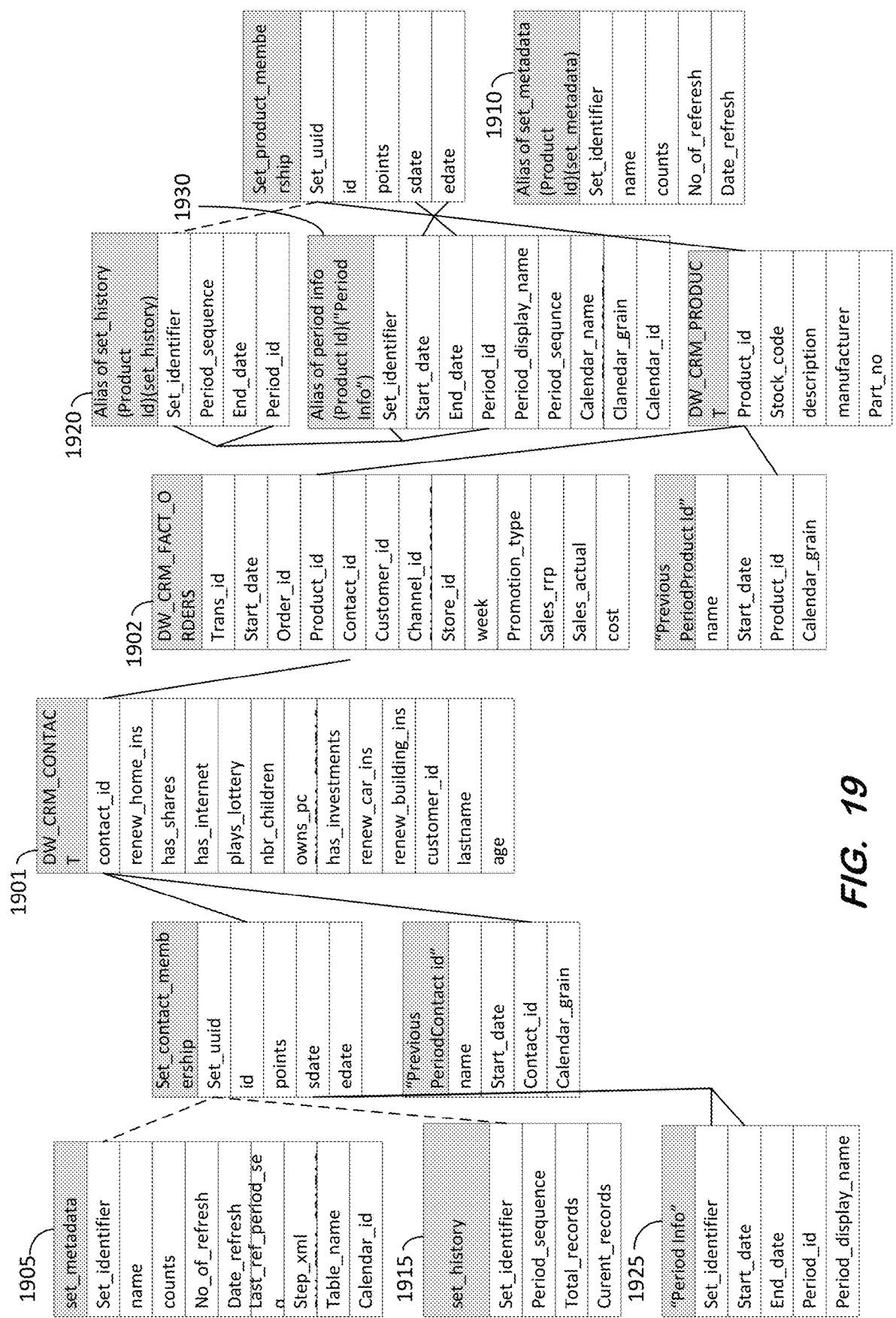
FIG. 19 is an example depiction of tables joined together, including original tables and aliases thereof.

FIG. 18 includes an example of sample code to create alias tables for an original core table. In some aspects, aliases may be generated automatically. Referring to FIG. 19, an original table 1905 and a corresponding alias table 1910 are shown. Additionally, original table 1915 and a corresponding alias table 1920, as well as original table 1925 and a corresponding alias table 1930 are also shown. As shown, "set_contact membership" table 1903 is joined to "history" table 1915, whereas "set_product membership" table 1904 is related to an alias history table 1920. Similar relationships are seen with tables 1905 and 1925 and their alias 1910 and 1930, respectively.

In some aspects, a database can have Views, where a View herein is a combination of multiple physical tables being displayed as one virtual table. In the context of the DF, these virtual tables are referred to as Derived Tables. In some embodiments, derived tables may be auto-generated in instances where it is determined there is no use-case to directly to include the physical tables. In some such scenarios, two or more physical tables may be combined into one derived table, where this derived table may be added to the DF instead of the multiple physical tables.

In some aspects, a SELECT statement may be used to define a derived table. FIG. 20 includes a SQL sample listing for joining two physical tables to appear as one table. The sample code of FIG. 20 relates to a specific problem related to temporal sets with calendars including calendar IDs and period IDs. The referenced tables provide user-friendly date representations and period (i.e., ordinal) representations. By having a query on a derived table, an end user might be presented with a calendar date, as opposed to a period/ordinal representation. In some aspects, derived tables provide a technical mechanism to display a query result in a specific, particular manner. In some aspects, a view may be presented to a user based on desired data of a virtual table, as opposed to data as included in a physical table. Furthermore, this expression may be used to create a derived table, as seen in FIG. 21.

In some situations and use-cases, a simple join may not be sufficiently powerful or useful and a more complex mechanism may be needed. In some aspects, such scenarios might be addressed by using a SQL statement describing the complex join. For example, FIG. 22 includes an illustrative example of a SQL statement defining a relationship that may be more complex than simply one attribute being associated with another attribute. FIG. 23 further graphically illustrates the complex join defined in FIG. 22.

FIG. 24 is an illustrative flow diagram of an example process 2400 for augmenting a semantic layer universe with data foundation additions or fragments universe. At operation 2405, at least one data foundation table is created for addition to a database. The owner of the database may be a customer (or other user) of a database management product or service, wherein the customer maintains the database separately and distinctly from a repository of data owned by an administrator or other entity providing and/or supporting the database management product or service. The at least one data foundation table may be created based information stored in a semantic layer universe of the customer in a first set container therein. The first set container may store one or more sets and information (e.g., metadata) regarding the sets. The stored information may specify the contents of each set, as well a description or specification of the structure of each set. This stored information may be used to create the at least one data foundation table that is consistent with the customer's database. As such, the at least one data foundation table created by process 2400 may be used by the customer consistent with their operations and workflows.

At operation 2410, particular tables of the data foundation tables created at operation 2405 may be linked to a customer table in the customer's database. The "particular" tables linked to a customer database in operation 2410 may be the Subject tables disclosed herein (e.g., FIGS. 15 and 16). As discussed above, Subject tables may be the only set tables to join directly to a customer's tables. In some aspects, a customer defines a Subject based on what category of sets are relevant to them (e.g., customers, products, etc.). Based on a determination and/or identification of subject BOs for a customer database, process 2400 operates to join a set table to an appropriate customer table. In some embodiments, the set table is joined to a primary key of a customer table.

At operation 2415, all of the created data foundation tables (i.e., data foundation fragments) are stored in a dedicated data structure hosted by the first (i.e., original) set container referenced in operation 2405. In some aspects, the DF tables created based on the set tables as disclosed in operation 2400 model the set tables and make them available in the augmented Universe and thereby expose them to the Query Panels.

Process 2400 may, in some embodiments, include all of the operations shown in FIG. 24, include fewer than all of the operations of FIG. 24, and comprise a portion of another process.

Figure 25:
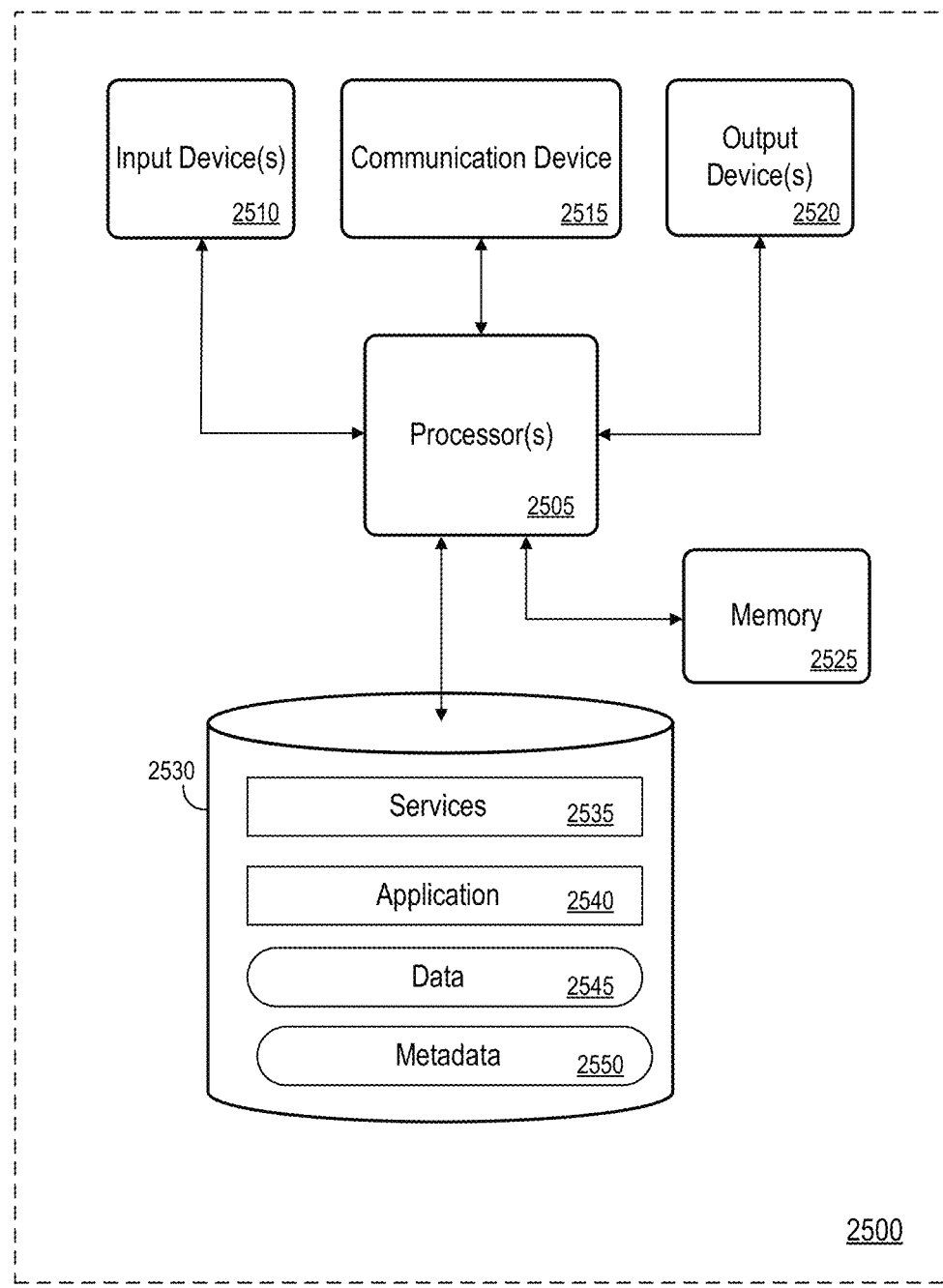
FIG. 25 is a block diagram of an apparatus, according to some embodiments.

FIG. 25 is a block diagram of apparatus 2500 according to some embodiments. Apparatus 2500 may comprise a computing apparatus and may execute program code to perform any of the functions described herein. Apparatus 2500 may comprise an implementation of server supporting an application (e.g., 210), a semantic layer 225, and a data store of FIG. 2 in some embodiments. Apparatus 2500 may include other unshown elements according to some embodiments.

Apparatus 2500 includes processor 2505 operatively coupled to communication device 2520, data storage device 2530, one or more input devices 2510, one or more output devices 2520 and memory 2525. Communication device 2515 may facilitate communication with external devices, such as a reporting client, or a data storage device. Input device(s) 2510 may comprise, for example, a keyboard, a keypad, a mouse or other pointing device, a microphone, knob or a switch, an infra-red (IR) port, a docking station, and/or a touch screen. Input device(s) 2510 may be used, for example, to enter information into apparatus 2500. Output device(s) 2520 may comprise, for example, a display (e.g., a display screen) a speaker, and/or a printer.

Data storage device 2530 may comprise any appropriate persistent storage device, including combinations of magnetic storage devices (e.g., magnetic tape, hard disk drives and flash memory), optical storage devices, Read Only Memory (ROM) devices, etc., while memory 2525 may comprise Random Access Memory (RAM), Storage Class Memory (SCM) or any other fast-access memory.

Services 2535 and application 2540 may comprise program code executed by processor 2505 to cause apparatus 2500 to perform any one or more of the processes (e.g., process 2400) described herein. Embodiments are not limited to execution of these processes by a single apparatus.

Data 2545 and metadata 2550 (either cached or a full database) may be stored in volatile memory such as memory 2525. Metadata 2550 may include information regarding fields, attributes, and methods of objects comprising a semantic layer. Data storage device 2530 may also store data and other program code and instructions for providing additional functionality and/or which are necessary for operation of apparatus 2500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
publish a semantic layer universe to expose objects of the universe, each of the objects being a semantic layer entity representative of a data structure having fields and attributes defined by metadata;
create, automatically, at least one data foundation table, each of the at least one data foundation tables being created for each of one or more set tables in a first database based on information stored in a first set container of a second semantic layer universe that contains the one or more set tables, the at least one set container being a data structure hosting at least one set including the one or more set tables and the information stored in the first set container specifying each set table it contains and a structure of each set table;
link at least one of the created data foundation tables to a customer table stored in the first database, the created data foundation table being linked to the customer table based on a primary key for the customer table;
store all the created data foundation tables in a dedicated data structure hosted by the first set container;
automatically generate, based on the generated at least one data foundation table, at least one object consistent with a schema of the customer table stored in the first database, each object being a semantic layer entity representative of a data structure having fields and attributes defined by metadata; and
inject the generated at least one object into the semantic layer universe.

2. The system of claim 1, wherein the information stored in a set container includes, for each of the set tables, a description of the structure of the set table.

3. The system of claim 1, wherein the at least one data foundation table being automatically created based on the information stored in a set container is performed for each set table.

4. The system of claim 1, further comprising:
generating a user interface aspect to surface the created at least one data foundation table on a display device; and
storing the generated user interface aspect in the dedicated data structure hosted by the first set container.

5. The system of claim 1, wherein an owner of the customer table defines the primary key for the customer table linked to the created data foundation table.

6. The system of claim 1, wherein each primary key corresponds to a particular subject.

7. The system of claim 1, wherein the linking of the data foundation table and the customer table is implemented by a join between the data foundation table and primary key column of the customer table and implementing the join includes setting a cardinality for the join.

8. A computer-implemented method for authoring extensions to a semantic layer universe, the method comprising:
publish a semantic layer universe to expose objects of the universe, each of the objects being a semantic layer entity representative of a data structure having fields and attributes defined by metadata;
creating, automatically, at least one data foundation table, each of the at least one data foundation tables being created for each of one or more set tables in a first database based on information stored in a first set container of a second semantic layer universe that contains the one or more set tables, the at least one set container being a data structure hosting at least one set including the one or more set tables and the information stored in the first set container specifying each set table it contains and a structure of each set table;
linking at least one of the created data foundation tables to a customer table in the database, the created data foundation table being linked to the customer table based on a primary key for the customer table;
storing all the created data foundation tables in a dedicated data structure hosted by the first set container;
automatically generating, based on the generated at least one data foundation table, at least one object consistent with a schema of the customer table stored in the first database, each object being a semantic layer entity representative of a data structure having fields and attributes defined by metadata; and
injecting the generated at least one object into the semantic layer universe.

9. The method of claim 8, wherein the information stored in a set container includes, for each of the set tables, a description of the structure of the set table.

10. The method of claim 8, wherein the at least one data foundation table being automatically created based on the information stored in a set container is performed for each set table.

11. The method of claim 8, further comprising:
generating a user interface aspect to surface the created at least one data foundation table on a display device; and
storing the generated user interface aspect in the dedicated data structure hosted by the first set container.

12. The method of claim 8, wherein an owner of the customer table defines the primary key for the customer table linked to the created data foundation table.

13. The method of claim 8, wherein each primary key corresponds to a particular subject.

14. The method of claim 8, wherein the linking of the data foundation table and the customer table is implemented by a join between the data foundation table and primary key column of the customer table and implementing the join includes setting a cardinality for the join.

15. A non-transitory computer readable medium having executable instructions stored therein, the medium comprising:
instructions to publish a semantic layer universe to expose objects of the universe, each of the objects being a semantic layer entity representative of a data structure having fields and attributes defined by metadata;
instructions to automatically create at least one data foundation table, each of the at least one data foundation tables being created for each of one or more set tables in a first database based on information stored in a first set container of a second semantic layer universe that contains the one or more set tables, the at least one set container being a data structure hosting at least one set including the one or more set tables and the information stored in the first set container specifying each set table it contains and a structure of each set table;
instructions to link at least one of the created data foundation tables to a customer table in the database, the created data foundation table being linked to the customer table based on a primary key for the customer table;
instructions to store all the created data foundation tables in a dedicated data structure hosted by the first set container;
instructions to automatically generate, based on the generated at least one data foundation table, at least one object consistent with a schema of the customer table stored in the first database, each object being a semantic layer entity representative of a data structure having fields and attributes defined by metadata; and
instructions to inject the generated at least one object into the semantic layer universe.

16. The medium of claim 15, wherein the information stored in a set container includes, for each of the set tables, a description of the structure of the set table.

17. The medium of claim 15, wherein the at least one data foundation table being automatically created based on the information stored in a set container is performed for each set table.

18. The medium of claim 15, further comprising:
generating a user interface aspect to surface the at least one data foundation table created on a display device; and
storing the generated user interface aspect in the dedicated data structure hosted by the first set container.

19. The medium of claim 15, wherein an owner of the customer table defines the primary key for the customer table linked to the created data foundation table.

20. The medium of claim 15, wherein the linking of the data foundation table and the customer table is implemented by a join between the data foundation table and primary key column of the customer table and implementing the join includes setting a cardinality for the join.

* * * * *